(12) United States Patent
Oka et al.

(10) Patent No.: US 9,366,911 B2
(45) Date of Patent: Jun. 14, 2016

(54) AUTOSTEREOSCOPIC DISPLAY DEVICE (71) Applicant: Japan Display Inc., Mobara-shi, Chiba (JP)

(72) Inventors: Shinichiro Oka, Hitachi (JP); Tatsuya Sugita, Takahagi (JP); Shinichi Komura, Mobara (JP)

(73) Assignee: JAPAN DISPLAY INC., Tokyo (JP)

( * ) Notice: Subject to any disclaimer, the term of this patent is extended or adjusted under 35 U.S.C. 154(b) by 458 days.

(21) Appl. No.: 13/740,384

(22) Filed: Jan. 14, 2013

(65) Prior Publication Data

US 2013/0188118 A1    Jul. 25, 2013

(30) Foreign Application Priority Data

Jan. 20, 2012 (JP) ................. 2012-009591

(51) Int. Cl.
| | |
|---|---|
| *G02F 1/1335* | (2006.01) |
| *G02F 1/133* | (2006.01) |
| *G02F 1/1339* | (2006.01) |
| *G02B 27/22* | (2006.01) |
| *H04N 13/04* | (2006.01) |

(52) U.S. Cl.
CPC .......... *G02F 1/1339* (2013.01); *G02B 27/2214* (2013.01); *H04N 13/0404* (2013.01); *G02B 27/22* (2013.01); *G02B 27/225* (2013.01); *G09G 2320/0209* (2013.01); *H04N 13/0402* (2013.01); *H04N 13/0409* (2013.01); *H04N 13/0452* (2013.01)

(58) Field of Classification Search
CPC combination set(s) only.
See application file for complete search history.

(56) References Cited

U.S. PATENT DOCUMENTS

| | | | |
|---|---|---|---|
| 5,493,427 A | 2/1996 | Nomura et al. | |
| 6,642,991 B2* | 11/2003 | Hogue | B32B 17/10036 349/153 |
| 6,734,923 B2* | 5/2004 | Kwon et al. | 349/15 |
| 7,692,732 B2* | 4/2010 | Tsubokura et al. | 349/58 |
| 7,920,240 B2* | 4/2011 | Yonemura | 349/141 |
| 2010/0149444 A1* | 6/2010 | Hikmet et al. | 349/15 |
| 2010/0208185 A1* | 8/2010 | Van Bommel et al. | 349/139 |
| 2011/0199570 A1* | 8/2011 | Murata et al. | 349/158 |
| 2013/0222715 A1* | 8/2013 | Uehara et al. | 349/15 |

FOREIGN PATENT DOCUMENTS

| | | |
|---|---|---|
| JP | 7-72445 | 3/1995 |
| JP | 2003-029246 A | 1/2003 |

(Continued)

OTHER PUBLICATIONS

Fukui Kosuke, English Machine Translation of JP2005031137, Feb. 3, 2005, Seiko Epson Corp.*

(Continued)

*Primary Examiner* — Jessica M Merlin
*Assistant Examiner* — Mark Teets
(74) *Attorney, Agent, or Firm* — Typha IP LLC (57) ABSTRACT

The present invention provides an autostereoscopic display device including: a display device; and a liquid crystal lens cell arranged on the display device, the liquid crystal lens cell including: a first substrate; a second substrate; a liquid crystal layer sandwiched between the first substrate and the second substrate; a first electrode arranged on the first substrate on the side of the liquid crystal layer; and a second electrode arranged on the second substrate on the side of the liquid crystal layer, in which the liquid crystal lens cell has a water-absorption layer arranged on at least one of the first substrate and the second substrate on the side of the liquid crystal layer.

18 Claims, 7 Drawing Sheets

(56) References Cited

FOREIGN PATENT DOCUMENTS

| JP | 2003-050398 A | 2/2003 |
| JP | 2004-258631 A | 9/2004 |
| JP | 2005-031137 A | 2/2005 |

OTHER PUBLICATIONS

Office Action issued by Japanese Patent Office on Feb. 17, 2015 regarding a counterpart Japanese patent application No. 2012-009591.

* cited by examiner

AUTOSTEREOSCOPIC DISPLAY DEVICE

CLAIM OF PRIORITY

The present application claims priority from Japanese Patent Application JP2012-009591 filed on Jan. 20, 2012, the content of which is hereby incorporated by reference into this application.

BACKGROUND OF THE INVENTION

1. Field of the Invention

The present invention relates to an autostereoscopic display device (3-D display device), and particularly to a useful technique by being applied to a lenticular-type autostereoscopic display device using liquid crystal lens cells.

2. Description of the Related Art

As an autostereoscopic display device (3-D display device) with which autostereoscopic images (3-D images) can be viewed without dedicated eyeglasses, a device using a lenticular lens has been known.

In the autostereoscopic display device using the lenticular lens, for example, the lenticular lens is arranged on a display surface such as a liquid crystal display panel, images for the left and right eyes are alternately displayed on the liquid crystal display panel, and the images for the left and right eyes are separated from each other by the lenticular lens. An observer observes the images for the left and right eyes separated through the lenticular lens with his/her left and right eyes, respectively, so that a three-dimensional autostereoscopic image can be observed.

Japanese Patent Application Laid-Open No. Hei 07-072445 discloses an autostereoscopic display device using a lenticular lens in which a liquid crystal lens cell is used as the lenticular lens.

SUMMARY OF THE INVENTION

The liquid crystal lens cell has therein only a transparent conductive film (for example, ITO (Indium Tin Oxide)) configuring an electrode, bead spacers to keep the intervals of cells constant, an alignment layer, and an inorganic insulating film, and has the small number of members to absorb water.

Therefore, if the autostereoscopic display device using the liquid crystal lens cell is in a high temperature and humidity environment, moisture enters a liquid crystal layer of the liquid crystal lens cell, and the moisture dissolved in the liquid crystal layer is disadvantageously eluted if the temperature is lowered.

The present invention has been achieved to solve the above-described problems of the conventional technique, and an object of the present invention is to provide a technique capable of preventing moisture dissolved in a liquid crystal layer of a liquid crystal lens cell from being eluted when the temperature is lowered in an autostereoscopic display device using the liquid crystal lens cell.

The above and other objects, and novel characteristics of the present invention will become apparent from the description of the specification and the accompanying drawings.

The followings are summaries of representative aspects of the invention disclosed in the application.

(1) The present invention provides an autostereoscopic display device including: a display device; and a liquid crystal lens cell arranged on the display device, the liquid crystal lens cell including: a first substrate; a second substrate; a liquid crystal layer sandwiched between the first substrate and the second substrate; a first electrode arranged on the first substrate on the side of the liquid crystal layer; and a second electrode arranged on the second substrate on the side of the liquid crystal layer, wherein the liquid crystal lens cell has a water-absorption layer arranged on at least one of the first substrate and the second substrate on the side of the liquid crystal layer.

(2) In (1), the water-absorption layer is made of acrylic resin or epoxy resin.

(3) In (1), the water-absorption layer is arranged between the first substrate and the first electrode, or on the first electrode on the side of the liquid crystal layer.

(4) In (1), the water-absorption layer is arranged between the second substrate and the second electrode, or on the second electrode on the side of the liquid crystal layer.

(5) In (1), $7.5<(d/Th)<100$ is satisfied, where the thickness of the liquid crystal layer is d and the thickness of the water-absorption layer is Th.

(6) In (1), the first electrode is a comb-like electrode, the second electrode is a plane-like electrode, and $3.5<(Q/d)<7$, preferably $4.5<(Q/d)<5.5$, or more preferably $(Q/d)=5$ is satisfied, where the thickness of the liquid crystal layer is d and the pitch of the comb-like electrode is Q.

(7) In (1), the first electrode is a comb-like electrode, the second electrode is a plane-like electrode, and $10<(Q/L)$, or preferably $15<(Q/L)<20$ is satisfied, where the pitch of the comb-like electrode is Q and the width of the comb-like electrode is L.

(8) In (1), bead spacers arranged inside the liquid crystal layer are provided, and the number of bead spacers per 1 mm² of the liquid crystal layer is 10 or less.

The following is a summary of an effect obtained by representative aspects of the invention disclosed in the application.

According to the present invention, it is possible to prevent moisture dissolved in a liquid crystal layer of a liquid crystal lens cell from being eluted when the temperature is lowered in an autostereoscopic display device using the liquid crystal lens cell.

DETAILED DESCRIPTION OF THE EMBODIMENT

Hereinafter, modes for carrying out the present invention will be described using the drawings based on embodiments. Each of the following embodiments shows a concrete example of content of the present invention. The present invention is not limited to the embodiments, but can be variously changed and modified by those skilled in the art within a range of technical ideas disclosed in the specification.

Further, the following embodiments are not meant to limit the interpretation of the claims of the present invention.

Furthermore, the constitutional elements having the same functions are given the same reference numerals throughout the all drawings for explaining the embodiments, and the explanations thereof will not be repeated in some cases.

[First Embodiment]

Figure 1:
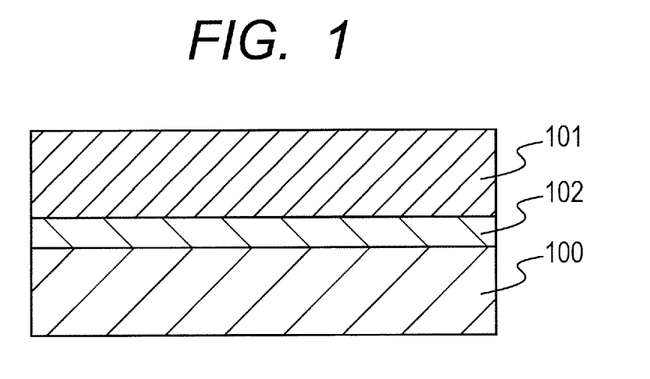
FIG. 1 is a block diagram for showing an outline configuration of an autostereoscopic display device according to a first embodiment of the present invention.

FIG. 1 is a block diagram for showing an outline configuration of an autostereoscopic display device according to a first embodiment of the present invention.

As shown in FIG. 1, the autostereoscopic display device of the embodiment includes a display device 100 and a liquid crystal lens cell 101. For the display device 100, used is a liquid crystal display panel or an organic EL display panel that is a self-luminous display.

The liquid crystal lens cell 101 is attached on the display device 100 through a transparent adhesive member 102. In this case, for example, UV cured resin or the like is used for the transparent adhesive member 102.

Figure 2:
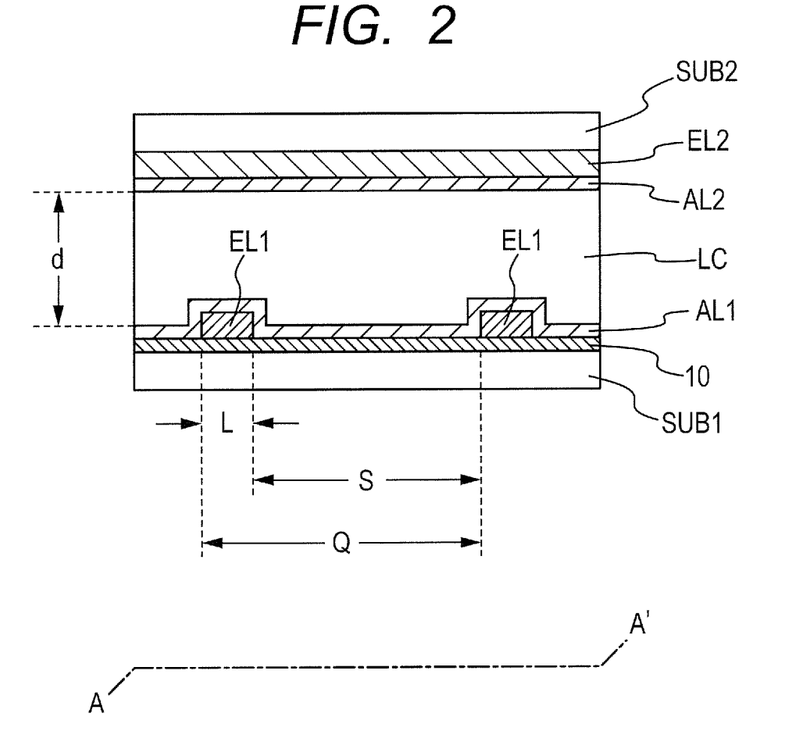
FIG. 2 is a cross-sectional view for showing a cross-sectional structure of a liquid crystal lens cell shown in FIG. 1.

FIG. 2 is a cross-sectional view for showing a cross-sectional structure of the liquid crystal lens cell 101 shown in FIG. 1.

As shown in FIG. 2, the liquid crystal lens cell 101 includes a first substrate (SUB1), a second substrate (SUB2), and a liquid crystal layer (LC) sandwiched between the first substrate (SUB1) and the second substrate (SUB2). The first substrate (SUB1) and the second substrate (SUB2) are configured using, for example, transparent substrates such as glass substrates. In this case, the surface of the first substrate (SUB1) on the side opposed to the liquid crystal layer (LC) is attached on the display device 100 through the adhesive member 102. Thus, the surface of the second substrate (SUB2) on the side opposed to the liquid crystal layer (LC) serves as an observing surface observed by an observer.

On the surface of the first substrate (SUB1) on the side of the liquid crystal layer (LC), a first electrode (EL1) is formed on which an alignment layer (AL1) is formed. Likewise, on the surface of the second substrate (SUB2) on the side of the liquid crystal layer (LC), a second electrode (EL2) is formed on which an alignment layer (AL2) is formed. It should be noted that bead spacers used to keep the interval of the liquid crystal layer (LC) constant are not illustrated in FIG. 2.

In FIG. 2, the reference numeral 10 denotes a water-absorption layer. The water-absorption layer 10 is desirably a film made of water-absorbing, transparent organic material, and for example, transparent acrylic resin or epoxy resin is used. Acrylic resin is especially desirable due to its excellent water absorbability.

In this case, the alignment layers (AL1 and AL2) are horizontally aligned. Further, positive dielectric constant anisotropy material is used for the liquid crystal layer (LC).

Figure 3A:
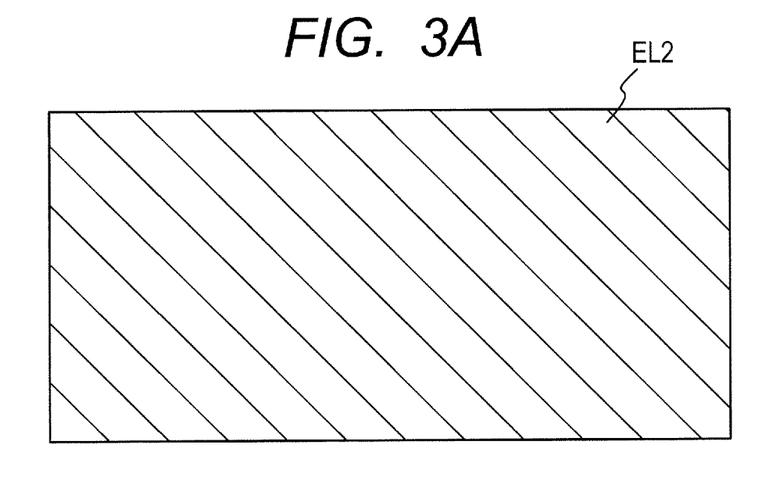
FIGS. 3A and 3B are diagrams for showing the electrode shapes of a first electrode and a second electrode shown in FIG. 2.
Figure 3B:
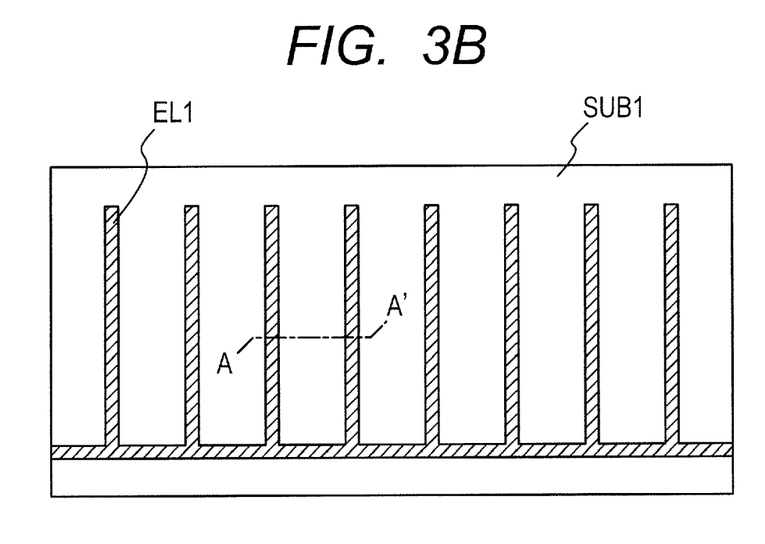

FIGS. 3A and 3B are diagrams for showing the electrode shapes of the first electrode (EL1) and the second electrode (EL2) shown in FIG. 2. The second electrode (EL2) is a plane-like electrode as shown in FIG. 3A, and the first electrode (EL1) is a comb-like electrode as shown in FIG. 3B.

In this case, the first electrode (EL1) and the second electrode (EL2) are configured using, for example, transparent electrodes made of ITO (Indium Tin Oxide). It should be noted that FIG. 2 illustrates a cross-sectional structure taken along the section line A-A' of FIG. 3B.

Figure 4A:
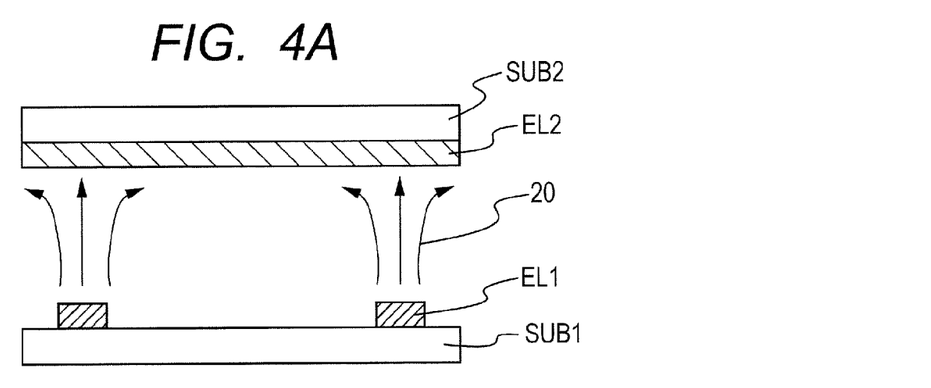
FIGS. 4A, 4B, and 4C are diagrams each explaining an operation of the liquid crystal lens cell shown in FIG. 2.
Figure 4B:
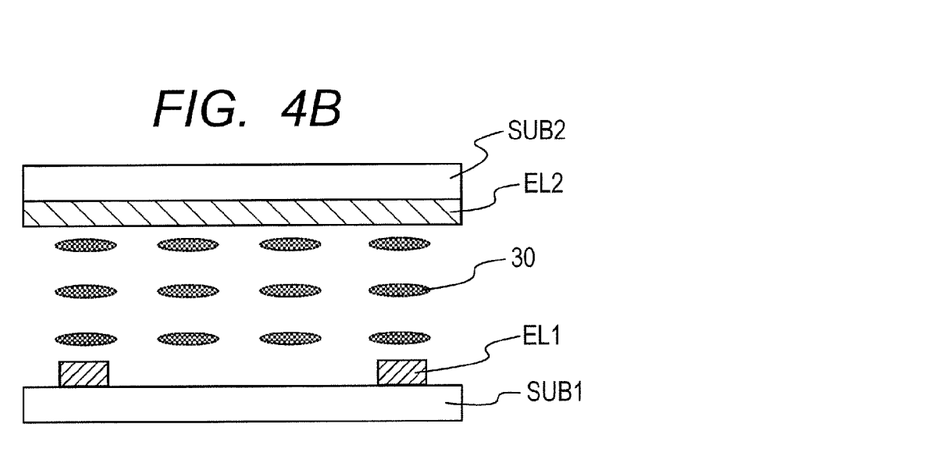
Figure 4C:
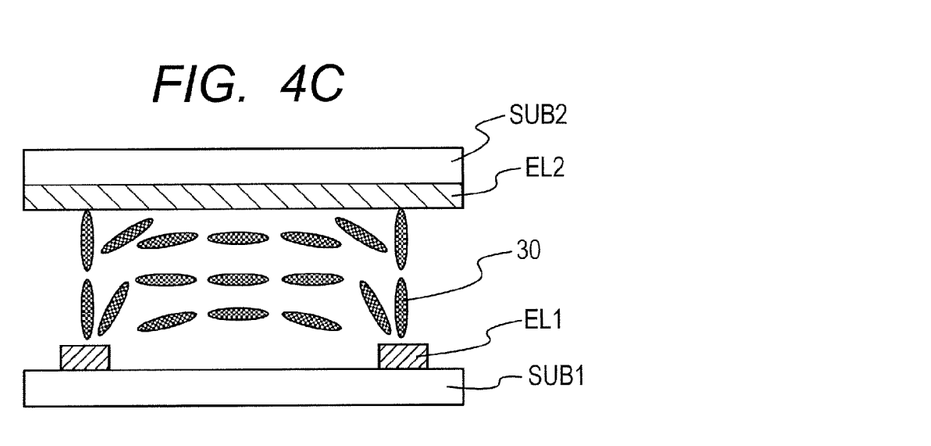

FIGS. 4A, 4B, and 4C are diagrams each explaining an operation of the liquid crystal lens cell 101 shown in FIG. 2. It should be noted in FIGS. 4A, 4B, and 4C that the reference numeral 20 denotes lines of electric force and 30 denotes liquid crystal molecules.

Alternating-current voltage is applied between the first electrode (EL1) and the second electrode (EL2). For example, if high-potential voltage higher than that for the second electrode (EL2) is applied to the first electrode (EL1), the lines of electric force 20 are generated in the direction from the first electrode (EL1) towards the second electrode (EL2) as shown in FIG. 4A. Although not shown in the drawing, if high-potential voltage higher than that for the first electrode (EL1) is applied to the second electrode (EL2), the lines of electric force 20 are generated in the direction from the second electrode (EL2) towards the first electrode (EL1).

Further, in a state where no voltage is applied between the first electrode (EL1) and the second electrode (EL2), the liquid crystal molecules 30 are in parallel with the first substrate (SUB1) and the second substrate (SUB2) as shown in FIG. 4B. In this case, an image displayed on the display device 100 passes through as it is, and thus an observer can observe a two-dimensional image.

In addition, in a state where voltage is applied between the first electrode (EL1) and the second electrode (EL2), the liquid crystal molecules 30 are aligned in the electric field direction as shown in FIG. 4C and the refractive index distribution of the liquid crystal layer (LC) is changed. Thus, when images for the left and right eyes that are alternately displayed on the display device 100 pass through the liquid crystal lens cell 101, the travelling directions thereof are changed and the images are separated from each other. Accordingly, an observer observes the images for the left and right eyes separated through the liquid crystal lens cell 101 with his/her left and right eyes, respectively, so that a three-dimensional autostereoscopic image can be observed. It should be noted that the principle in which a three-dimensional autostereoscopic image develops in the autostereoscopic display device of the embodiment is described in Japanese Patent Application Laid-Open No. Hei 07-072445.

As described above, a two-dimensional image and a three-dimensional image can be switched to each other using a lens effect (GRIN lens) by the refractive index distribution of the liquid crystal lens cell 101 in the embodiment.

In FIG. 2, d represents the thickness of the liquid crystal layer (LC), Q represents the pitch of the comb-like electrode configuring the first electrode (EL1), and L represents the width of the comb-like electrode. Accordingly, S=Q−L is satisfied.

Figure 5:
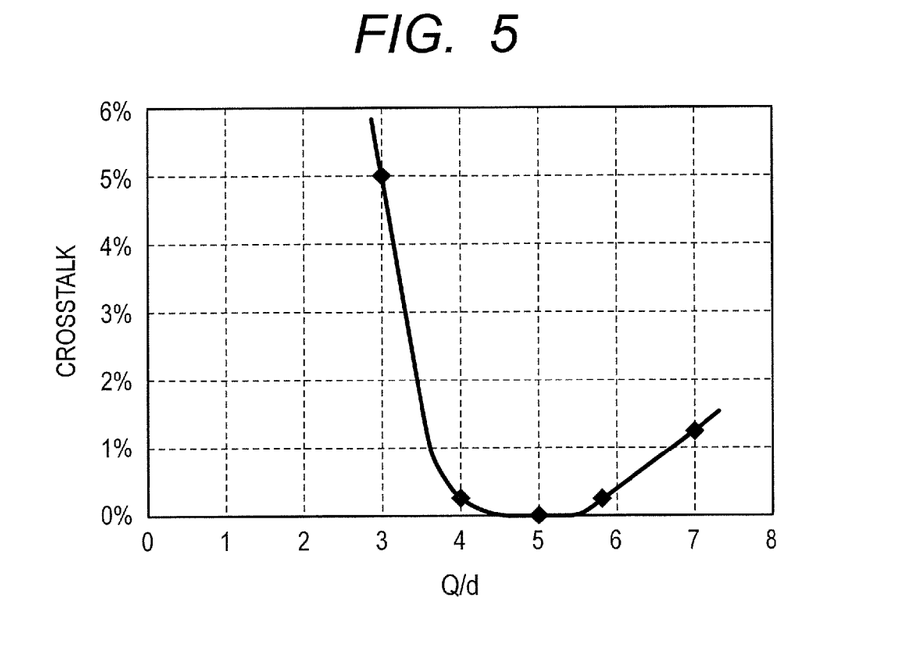
FIG. 5 is a graph for showing a result of having simulated an impact on crosstalk by a ratio (Q/d) of the pitch Q of a comb-like electrode configuring the first electrode to the thickness d of a liquid crystal layer.

FIG. 5 is a graph for showing a result of having simulated an impact on crosstalk by a ratio (Q/d) of the pitch Q of the comb-like electrode configuring the first electrode (EL1) to the thickness d of the liquid crystal layer (LC).

It should be noted that the crosstalk represents a fraction of images for the right eye mixed in images for the left eye (or a fraction of images for the left eye mixed in images for the right eye) in a state where voltage is applied between the first electrode (EL1) and the second electrode (EL2) to display a three-dimensional autostereoscopic image.

People hardly recognize 1% or less of crosstalk with their eyes. Thus, as being apparent from FIG. 5, (Q/d) is desirably 3.5<(Q/d)<7. More preferably, (Q/d) is 4.5<(Q/d)<5.5 in order to decrease the crosstalk. Further, much more preferably, (Q/d) is about 5 (Q/d≈5). Specifically, when (Q/d) is 5, it is possible to obtain the best lens effect.

Figure 6:
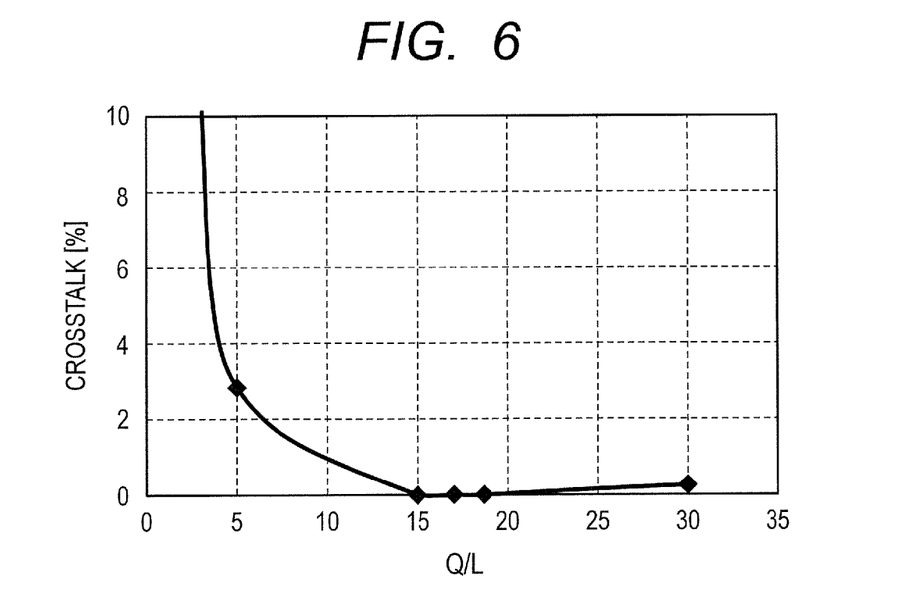
FIG. 6 is a graph for showing a result of having simulated an impact on crosstalk by a ratio (Q/L) of the pitch Q of the comb-like electrode configuring the first electrode to the width L of the comb-like electrode when (Q/d) is 5.

FIG. 6 is a graph for showing a result of having simulated an impact on crosstalk by a ratio (Q/L) of the pitch Q of the comb-like electrode configuring the first electrode (EL1) to the width L of the comb-like electrode when (Q/d) is 5.

As being apparent from FIG. 6, Q/L is desirably 15<(Q/L) <20. Further, Q/L is more desirably 10<(Q/L) when the crosstalk is 1% or less.

Figure 7A:
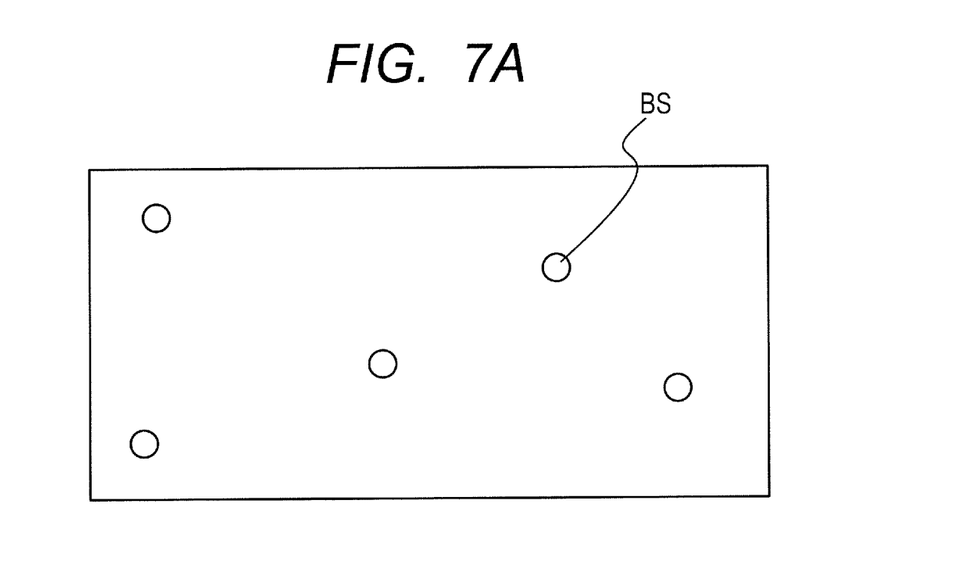
FIG. 7A is an outline view for showing a state of bead spacers dispersed in the liquid crystal lens cell according to the first embodiment of the present invention.

FIG. 7A is an outline view for showing a state of bead spacers (BS) dispersed in the liquid crystal lens cell 101 of the embodiment. It should be noted that FIG. 7B shows a state of bead spacers (BS) dispersed in a general liquid crystal display panel (a TN-type or STN-type liquid crystal display panel) as a comparison example.

In order to obtain the lens effect, the liquid crystal lens cell 101 needs to have a large retardation (Δn×d). In the embodiment, the thickness (d) of the liquid crystal layer (LC) is set at, for example, 30 μm. In this case, the bead spacers (BS) each having a size of at least 20 μm or larger are necessary.

Therefore, the bead spacers (BS) become visible by an observer. Thus, as shown in FIG. 7A, the number of bead spacers is desirably 1 per 1 mm$^2$ (1/mm$^2$) in the case of the liquid crystal lens cell 101. In addition, it is necessary to disperse the bead spacers at a density of 10 per 1 mm$^2$ (10/mm$^2$) or less at the most.

Figure 7B:
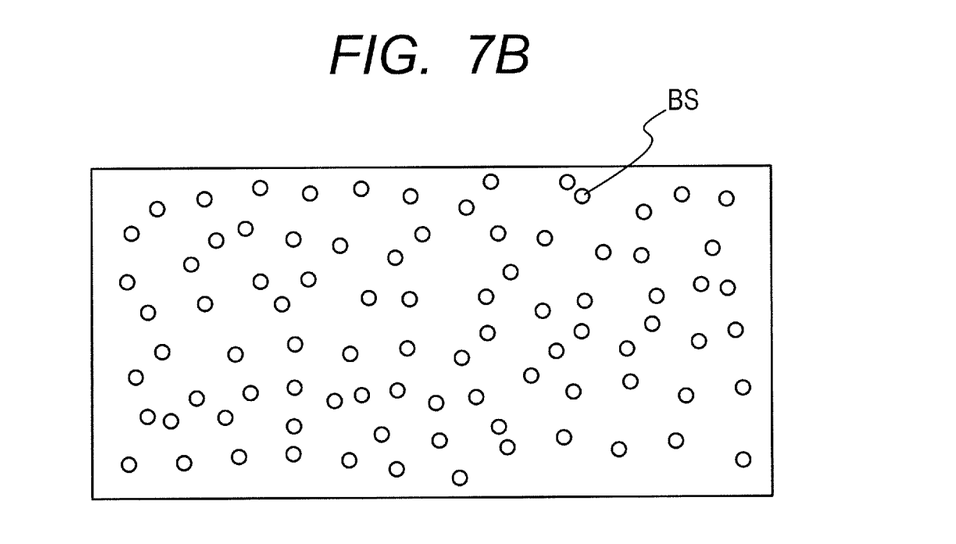
FIG. 7B is an outline view for showing a state of bead spacers dispersed in a general liquid crystal display panel (a TN-type or STN-type liquid crystal display panel)

On the other hand, as shown in FIG. 7B, it is common to disperse the bead spacers at a density of 100 to 200 per 1 mm$^2$ (100 to 200/mm$^2$) in the general liquid crystal display panel.

The circumference of the liquid crystal display panel used in the embodiment is sealed with a seal member (not shown). However, if the liquid crystal display panel is left in a high temperature and humidity environment (for example, temperature: 70° C., humidity: 90%, water vapor pressure: about 281 hPa), moisture enters the inside of the liquid crystal layer (LC) at 0.06 ppm/hr. If the seal member is changed, this velocity is accordingly changed. However, the velocity is not largely changed. The moisture enters mainly from the seal member and a substrate interface. Thus, if the gap is changed, the velocity is not largely changed.

The moisture that has entered is absorbed by the liquid crystal layer (LC), the bead spacers (BS), and the alignment layers (AL1 and AL2). In this case, the velocity of the amount of moisture absorbed by the bead spacers (BS) is dependent on the surface area of the bead spacers (BS).

The surface area of the bead spacer (BS) having a diameter of 30 μm used in the liquid crystal lens cell 101 is about 2827 μm$^2$, whereas the surface area of the bead spacer (BS) having a diameter of 4 μm used in the general liquid crystal display panel is about 50 μm$^2$.

In this case, it is assumed that 10 bead spacers (BS) per 1 mm$^2$ are provided in the liquid crystal lens cell 101 and 200 bead spacers (BS) per 1 mm$^2$ are provided in the general liquid crystal display panel. In this case, if it is assumed that the number of bead spacers (BS) per unit volume (1 mm$^3$) is 1 in the liquid crystal lens cell 101, the number thereof is 150 in the general liquid crystal display panel.

Accordingly, the surface area of the bead spacers (BS) relative to the liquid crystal unit volume is 2827=2827 μm$^2$×1 in the liquid crystal lens cell and 7540=50 μm$^2$×150 in the general liquid crystal display panel.

Thus, the surface area of the bead spacers (BS) in the liquid crystal lens cell 101 is 37% of that in the general liquid crystal display panel.

The measurement of the water-absorbing ratio in the general liquid crystal display panel with 150 bead spacers (BS) each having a size of 4 μm per unit volume shows that water is absorbed at about 0.1 ppm/hr per unit volume.

On the other hand, the water-absorbing ratio of the liquid crystal lens cell 101 with 1 bead spacer (BS) having a size of 30 μm per unit volume is about 37% of 0.1 ppm/hr, namely, 0.037 ppm/hr.

If it is assumed that the amount of moisture entering the inside of the liquid crystal lens cell 101 with 1 bead spacer (BS) having a size of 30 μm per unit volume is 0.06 ppm/hr, it can be found that water cannot be sufficiently absorbed with the amount of beads of the liquid crystal lens cell 101.

On the other hand, in the case of the general liquid crystal display panel, moisture entering the inside of the liquid crystal layer can be completely absorbed by the bead spacers (BS).

It should be noted that as preconditions of the above-described calculation formulas, it is assumed that 10 bead spacers (BS) each having a size of 30 μm are dispersed per 1 mm$^2$ in the liquid crystal lens cell 101.

However, if the dispersed amount of bead spacers (BS) is increased, the bead spacers (BS) become visible. Thus, 1/mm$^2$ is desirable. Under the condition, it can be found that more moisture entering the inside of the liquid crystal lens cell 101 cannot be absorbed.

In the case where moisture enters the inside of the liquid crystal layer in a high temperature and humidity environment and then the temperature is returned to room temperature, the saturated amount of moisture that can be dissolved in the liquid crystal layer is decreased, and thus water is eluted, resulting in recognition as defects.

Figure 8:
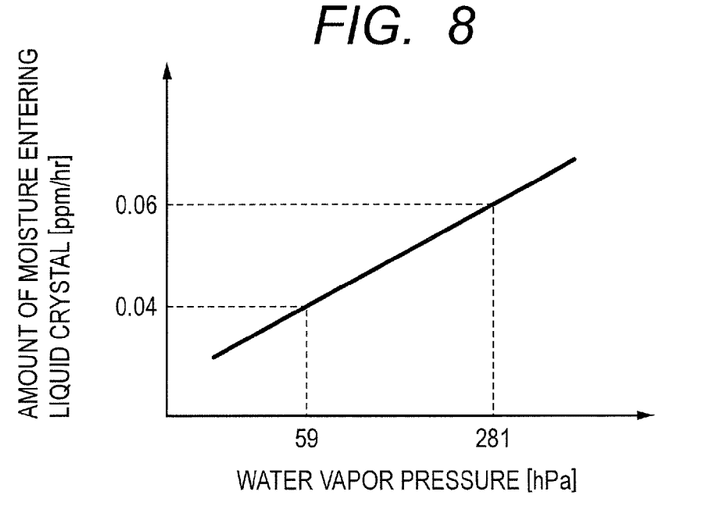
FIG. 8 is a graph for showing a relation between a water vapor pressure and the amount of moisture entering the liquid crystal layer.

FIG. 8 shows a graph of a relation between a water vapor pressure and the amount of moisture entering the liquid crystal layer.

The amount of moisture entering the liquid crystal layer is 0.06 ppm/hr at a water vapor pressure of 281 hPa (for example, temperature: 70° C., humidity: 90%). However, the amount of moisture is 0.04 at 59 hPa (for example, temperature: 36° C., humidity: 100%). Namely, in the case where the liquid crystal lens cell 101 without the water-absorption layer 10 is left in an environment at a water vapor pressure of 60 hPa or higher and moisture the mount of which exceeds the limit that can be absorbed by the liquid crystal layer (LC) enters, the water is eluted.

In order to solve the problem, the water-absorption layer 10 is arranged at the position shown in FIG. 2 in the embodiment. As described above, the water-absorption layer 10 is configured using a transparent organic insulating film such as acrylic resin or epoxy resin, and is extremely high in water-absorbing ratio as compared to the bead spacers (BS).

Therefore, even if moisture enters the inside of the liquid crystal layer (LC) in a high temperature and humidity environment, no water is accumulated in the liquid crystal layer (LC) until the water-absorption layer 10 becomes a saturated state in the embodiment. Even if, for example, a transparent organic insulating film is used for the absorbing member and is left for 2000 hr or longer in the environment such as a temperature of 70° C. and a humidity of 90%, the amount of moisture does not exceed the saturation value of the water-absorption layer 10. Thus, there is no possibility of exceeding the saturated amount of moisture in a general usage environment.

An experiment was conducted to measure water absorbing time for each of the liquid crystal lenses having different water-absorption layer thickness after the liquid crystal lenses had been left in a certain environment. The certain environment is that leaving the liquid crystal lens cell in a high temperature (70° C) and humidity environment (90%) for 500 hours. Water absorbing time is defined as a time which moisture begins to be absorbed by the water-absorption layer after the moisture penetrate into the liquid crystal lens cell.

Figure 9:
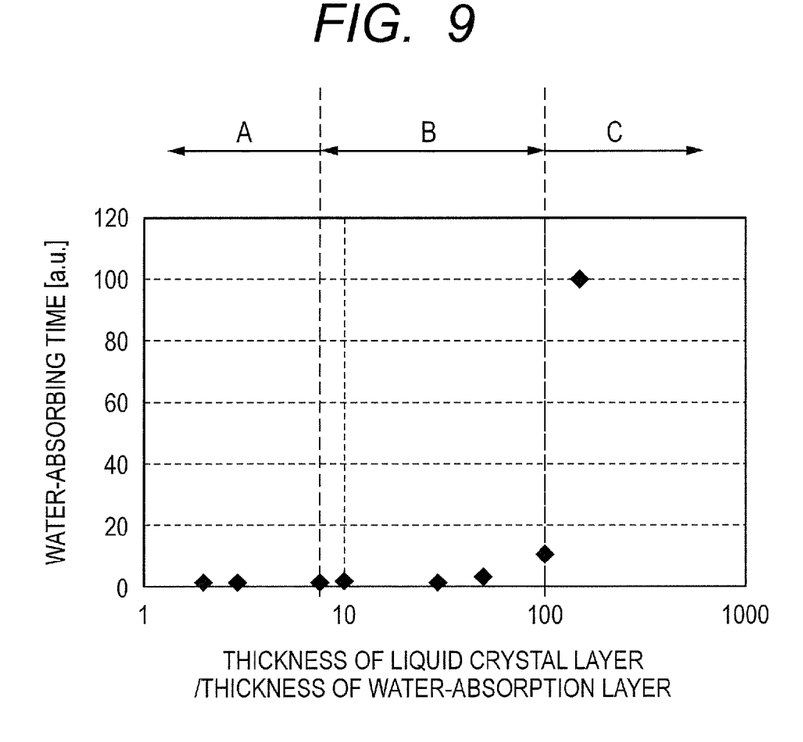
FIG. 9 is a graph for showing a result obtained by measuring a time required until moisture that enters when the liquid crystal lens cell is left in a high temperature and humidity environment (left for 500 hr in an environment such as a temperature of 70° C. and a humidity of 90%) is absorbed by a water-absorption layer, while the thickness of the water-absorption layer arranged in the liquid crystal lens cell is changed.

The measurement result is shown in FIG. 9. In the graph of FIG. 9, the horizontal axis represents a liquid crystal layer thickness/water-absorption layer thickness, and the vertical axis represents a water-absorbing time. The larger the horizontal axis is, the thinner the water-absorption layer 10 becomes. It should be noted that the thickness of the liquid crystal layer is 30 μm.

The water-absorbing time is saturated with a liquid crystal layer thickness/water-absorption layer thickness of 7.5 or smaller. Namely, the water-absorbing time is not changed. Further, the water-absorbing time is drastically increased with a liquid crystal layer thickness/water-absorption layer thickness of 100 or larger.

Accordingly, an area (C) of FIG. 9 is not desirable because the water-absorbing time is drastically increased, and the liquid crystal layer thickness/water-absorption layer thickness is desirably 100 or smaller.

Further, it is necessary to thicken the thickness of the water-absorption layer 10 in an area (A) of FIG. 9. In addition, there is a possibility that the transmissivity is decreased due to light absorption by the water-absorption layer 10, and thus the cost of material is increased due to the unnecessary film thickness. Further, since the water-absorbing time is sufficiently saturated with a liquid crystal layer thickness/water-absorption layer thickness of 7.5 or smaller, 7.5<liquid crystal layer thickness/water-absorption layer thickness<100 is desirable.

[Second Embodiment]

Figure 10:
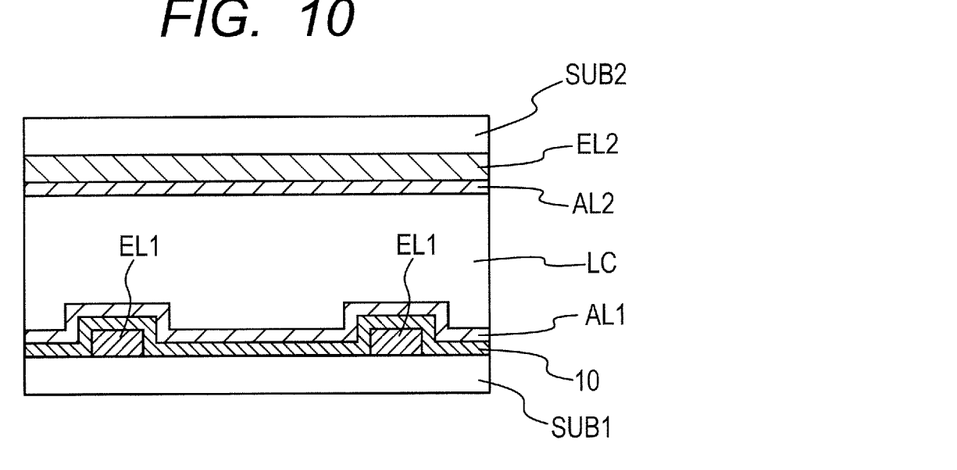
FIG. 10 is a cross-sectional view for showing a cross-sectional structure of a liquid crystal lens cell of an autostereoscopic display device according to a second embodiment of the present invention.

FIG. 10 is a cross-sectional view for showing a cross-sectional structure of a liquid crystal lens cell 101 of an autostereoscopic display device according to a second embodiment of the present invention.

The second embodiment is different from the first embodiment in that a water-absorption layer 10 is arranged on a first electrode (EL1) that is a comb-like electrode, and an alignment layer (AL1) is arranged on the water-absorption layer 10 as shown in FIG. 10.

In the embodiment, if the water-absorption layer 10 has insulation properties, it is possible to prevent short-circuit caused by a contact between the first electrode (EL1) and a second electrode (EL2). Further, the arrangement of the water-absorption layer 10 on the first electrode (EL1) can improve a water-absorbing ratio.

[Third Embodiment]

Figure 11:
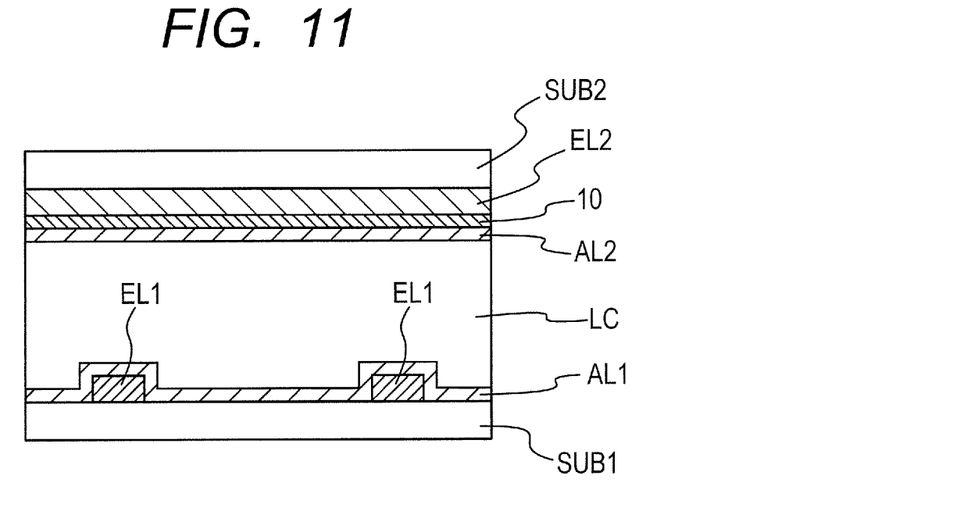
FIG. 11 is a cross-sectional view for showing a cross-sectional structure of a liquid crystal lens cell of an autostereoscopic display device according to a third embodiment of the present invention.

FIG. 11 is a cross-sectional view for showing a cross-sectional structure of a liquid crystal lens cell of an autostereoscopic display device according to a third embodiment of the present invention.

The third embodiment is different from the first embodiment in that a water-absorption layer 10 is arranged on a second electrode (EL2) that is a plane-like electrode on the side of a second substrate (SUB2) as shown in FIG. 11.

Accordingly, a water-absorbing ratio can be increased in the embodiment, and unevenness of the water-absorption layer 10 caused by a step of the first electrode (EL1) that is a problem in the second embodiment can be improved.

It should be noted that in each embodiment, the water-absorption layer 10 may be provided on each of the first substrate (SUB1) and the second substrate (SUB2). If a decrease in transmissivity caused by light absorption of the water-absorption layer 10 is taken into account, the water-absorption layer 10 is preferably provided on one of the first substrate (SUB1) and the second substrate (SUB2).

The invention achieved by the inventors has been concretely described above on the basis of the embodiments. However, it is obvious that the present invention is not limited to the embodiments, but can be variously changed without departing from the gist of the present invention.

Further, the present invention is not limited to the embodiments, but includes various modifications. For example, the embodiments have been described in detail to explain the present invention for easy understanding, and are not necessarily limited to those having the all constitutional elements as described above. Further, a part of the configuration in one embodiment can be replaced by one in another embodiment, and the configuration in one embodiment can be added to one in another embodiment. In addition, a part of the configuration in each embodiment can be added to or replaced by another, or deleted.

What is claimed is:

1. An autostereoscopic display device comprising:
    a display device; and
    a liquid crystal lens cell arranged on the display device, the liquid crystal lens cell including:
    a first substrate;
    a second substrate;
    a liquid crystal layer sandwiched between the first substrate and the second substrate;
    a first electrode arranged on the first substrate on the side of the liquid crystal layer; and
    a second electrode arranged on the second substrate on the side of the liquid crystal layer,
    wherein the liquid crystal lens cell has a water-absorbing layer arranged on at least one of the first substrate and the second substrate on the side of the liquid crystal layer,
    wherein $7.5<(d/Th)<100$ is satisfied, where the thickness of the liquid crystal layer is d and the thickness of the water-absorption film is Th,
    wherein the water-absorption film is arranged between the first substrate and the first electrode.

2. The autostereoscopic display device according to claim 1, wherein the water-absorption layer is made of acrylic resin or epoxy resin.

3. The autostereoscopic display device according to claim 1, wherein the first electrode is a comb-like electrode, the second electrode is a plane-like electrode, and $3.5<(Q/d)<7$ is satisfied, where the thickness of the liquid crystal layer is d and the pitch of the comb-like electrode is Q.

4. The autostereoscopic display device according to claim 3, wherein $4.5<(Q/d)<5.5$ is satisfied.

5. The autostereoscopic display device according to claim 4, wherein (Q/d) =5 is satisfied.

6. The autostereoscopic display device according to claim 1, wherein the first electrode is a comb-like electrode, the second electrode is a plane-like electrode, and 10<(Q/L) is satisfied, where the pitch of the comb-like electrode is Q and the width of the comb-like electrode is L.

7. The autostereoscopic display device according to claim 6, wherein 15<(Q/L)<20 is satisfied.

8. The autostereoscopic display device according to claim 1, wherein bead spacers arranged inside the liquid crystal layer are provided, and the number of bead spacers per 1 mm$^2$ of the liquid crystal layer is 10 or less.

9. A stereoscopic display device comprising:
   a display device; and
   a liquid crystal lens cell arranged on the display device, the liquid crystal lens cell including:
   a first substrate;
   a second substrate;
   a liquid crystal layer sandwiched between the first substrate and the second substrate;
   a first electrode arranged on the first substrate on the side of the liquid crystal layer;
   a second electrode arranged on the second substrate on the side of the liquid crystal layer,
   wherein a water-absorption film is arranged between the second substrate and the second electrode,
   wherein 7.5<(d/Th)<100 is satisfied, where the thickness of the liquid crystal layer is d and the thickness of the water-absorption film is Th.

10. The stereoscopic display device according to claim 9, wherein the water-absorption film is arranged on the second electrode on the side of the liquid crystal layer.

11. The stereoscopic display device according to claim 9, wherein 7.5<(d/Th)<100 is satisfied, where the thickness of the liquid crystal layer is d and the thickness of the water-absorption film is Th.

12. The stereoscopic display device according to claim 9, wherein the first electrode is a comb-like electrode, the second electrode is a plane-like electrode, and 3.5<(Q/d)<7 is satisfied, wherein the thickness of the liquid crystal layer is d and the pitch of the comb-like electrode is Q.

13. The stereoscopic display device according to claim 12, wherein 4.5<(Q/d)<5.5 is satisfied.

14. The stereoscopic display device according to claim 9, wherein the first electrode is a comb-like electrode, the second electrode is a plane-like electrode, and 10<(Q/L) is satisfied, where the pitch of the comb-like electrode is Q and the width of the comb-like electrode is L.

15. The stereoscopic display device according to claim 14, wherein 15<(Q/L)<20 is satisfied.

16. The stereoscopic display device according to claim 9, wherein bead spacers arranged inside the liquid crystal layer are provided and the number of bead spacers per 1 mm$^2$ of the liquid crystal layer is 10 or less.

17. A stereoscopic display device comprising:
   a display device; and
   a liquid crystal lens cell arranged on the display device, the liquid crystal lens cell including:
   a first substrate;
   a second substrate;
   a liquid crystal layer sandwiched between the first substrate and the second substrate;
   a first electrode arranged on the first substrate on the side of the liquid crystal layer; and
   a second electrode arranged on the second substrate on the side of the liquid crystal layer,
   wherein a first water-absorption film is arranged between the first substrate and the first electrode,
   wherein a second water-absorption film is arranged between the second substrate and the second electrode,
   wherein 7.5<(d/Th)<100 is satisfied, where the thickness of the liquid crystal layer is d and the thickness of each of the first water-absorption film and the second water-absorption film is Th.

18. The stereoscopic display device according to claim 17, wherein bead spacers arranged inside the liquid crystal layer are provided, and the number of bead spacers per 1 mm$^2$ of the liquid crystal layer is 10 or less.

* * * * *